United States Patent [19]

von Kaler et al.

[11] 4,212,210
[45] Jul. 15, 1980

[54] MULTI-SPEED TRANSMISSION WITH H-PATTERN SHIFT

[75] Inventors: Roland L. von Kaler, Tecumseh; Norman E. Jolliff, Tipton, both of Mich.

[73] Assignee: Tecumseh Products Company, Tecumseh, Mich.

[21] Appl. No.: 875,117

[22] Filed: Feb. 3, 1978

[51] Int. Cl.² .......... F16H 3/08; G05G 9/14; G05G 5/10
[52] U.S. Cl. .................................. 74/375; 74/477
[58] Field of Search .............. 74/473 R, 477, 371, 74/375

[56] References Cited

U.S. PATENT DOCUMENTS

| | | | |
|---|---|---|---|
| Re. 26,633 | 7/1969 | Musgrave | 74/477 X |
| 1,532,102 | 3/1925 | File | 74/375 |
| 1,852,247 | 4/1932 | Maier | 74/375 |
| 2,100,936 | 11/1937 | Bonn, Jr. | 74/375 |
| 3,812,735 | 5/1974 | von Kaler | 74/371 |

*Primary Examiner*—Allan D. Herrmann
*Attorney, Agent, or Firm*—Albert L. Jeffers

[57] ABSTRACT

A multi-speed transmission having an H-pattern shift has parallel output and intermediate shafts. An input shaft is connected to the intermediate shaft which has a gear connected to a reverse gear on the output shaft. The output shaft has first, second, and third forward gears, the reverse and forward gears having notches. The intermediate shaft has three gears connected to the forward gears. The output shaft has slots under the forward and reverse gears, the collars being movable in either direction from a neutral position. One slot has a key connected to one collar and extends toward the reverse gear engaging a notch therein in one position, the key having a portion extending toward the forward gears engaging a notch in the first gear in the other position of the collar. The other collar surrounds the portion of the key. Another slot has another key connected to the other collar, extending under the first gear and into a space between the second and third gears in the neutral position, engages a notch in the second gear in the first position, and engages a notch in the third gear in the second position of the other collar. A shift lever has an H-pattern movement. Links are connected to the collars and are engaged by the shift lever when moved away from its neutral position.

10 Claims, 8 Drawing Figures

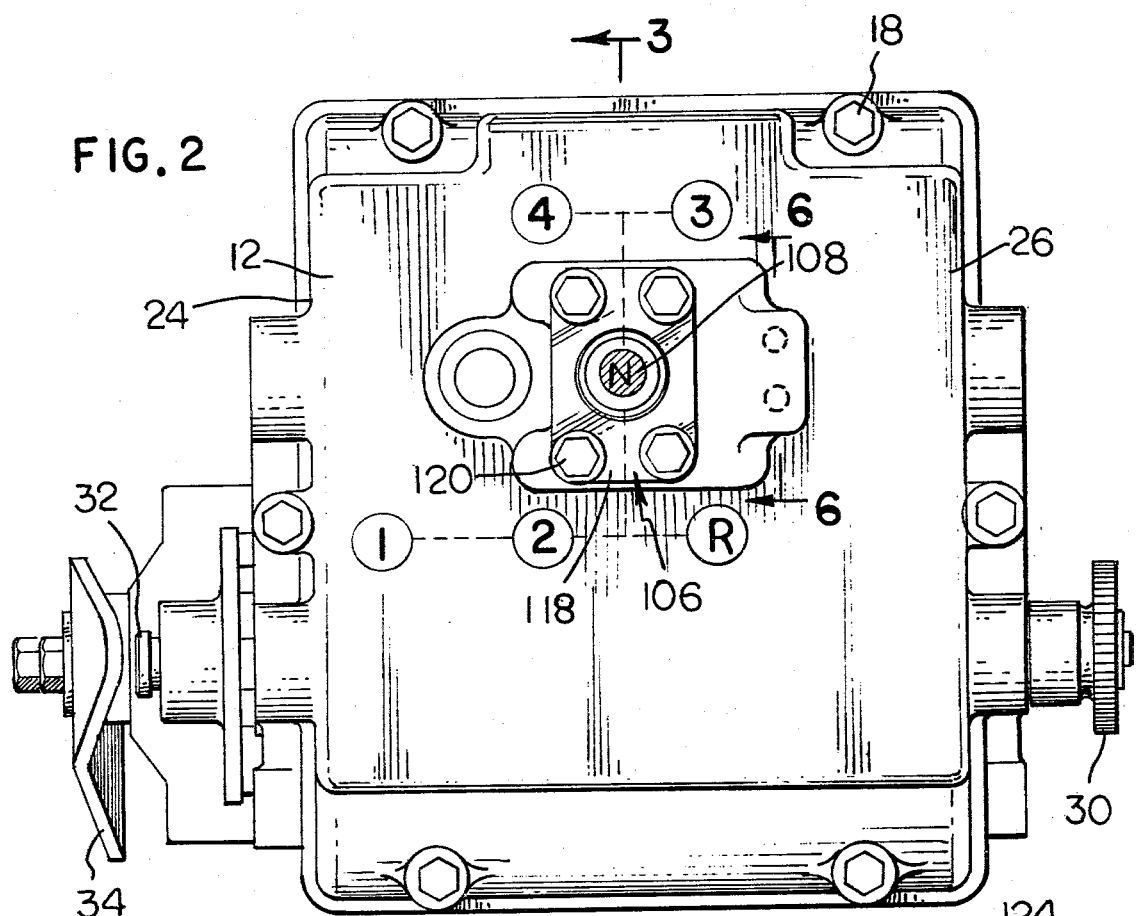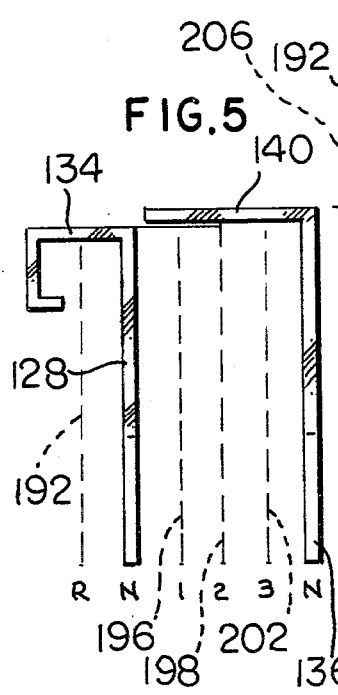

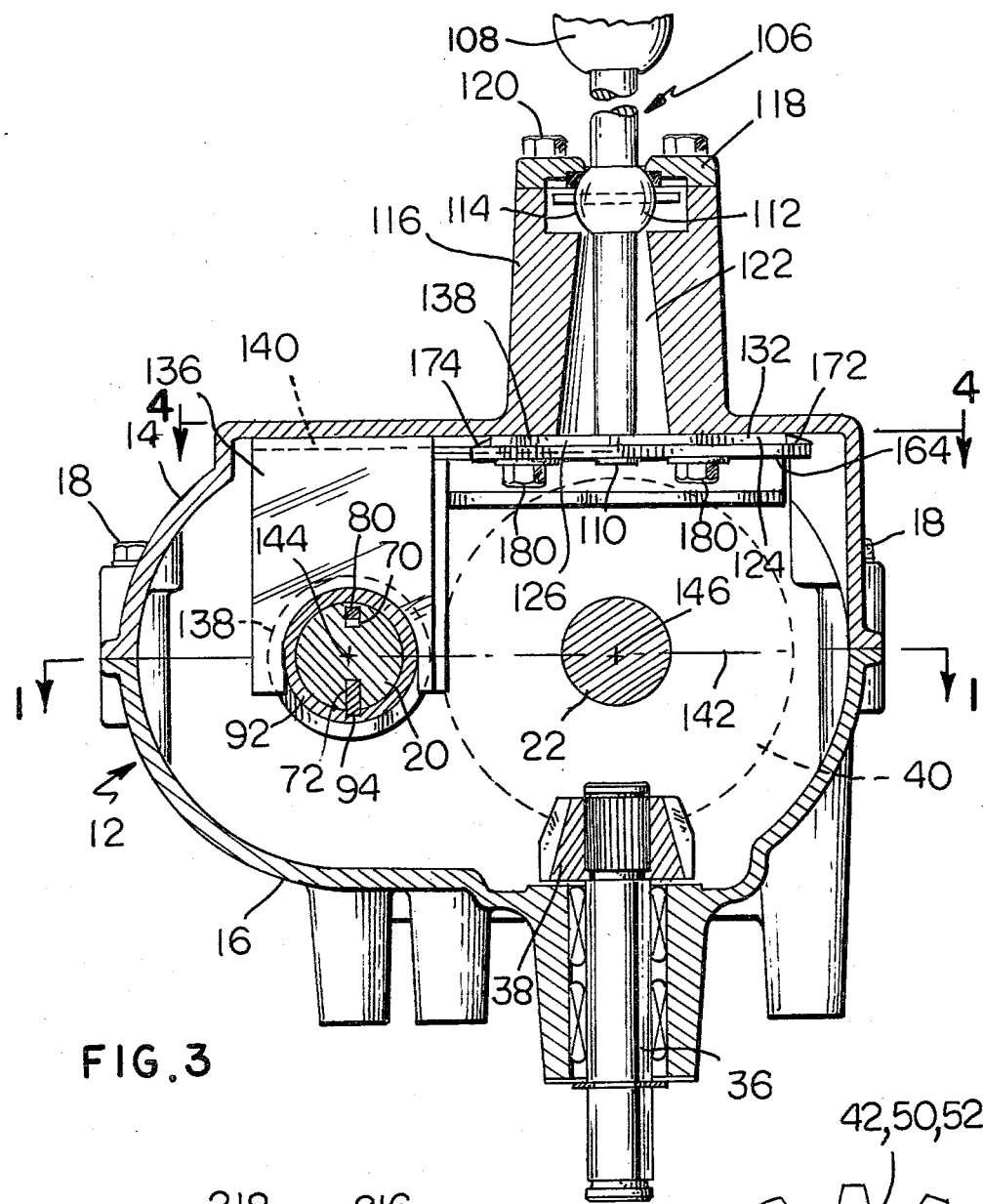
FIG. 3
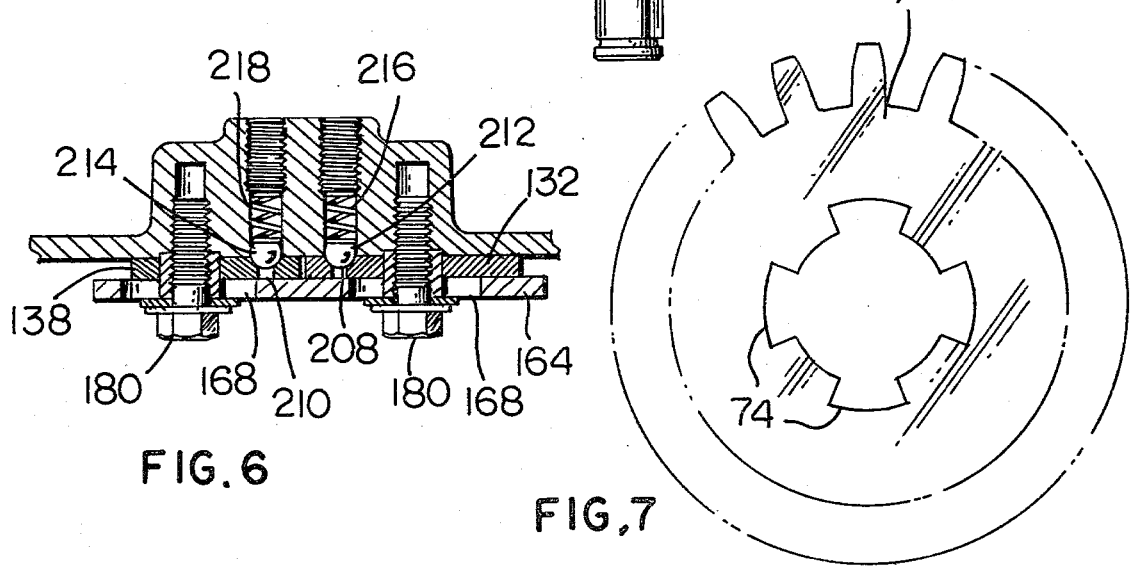
FIG. 6
FIG. 7

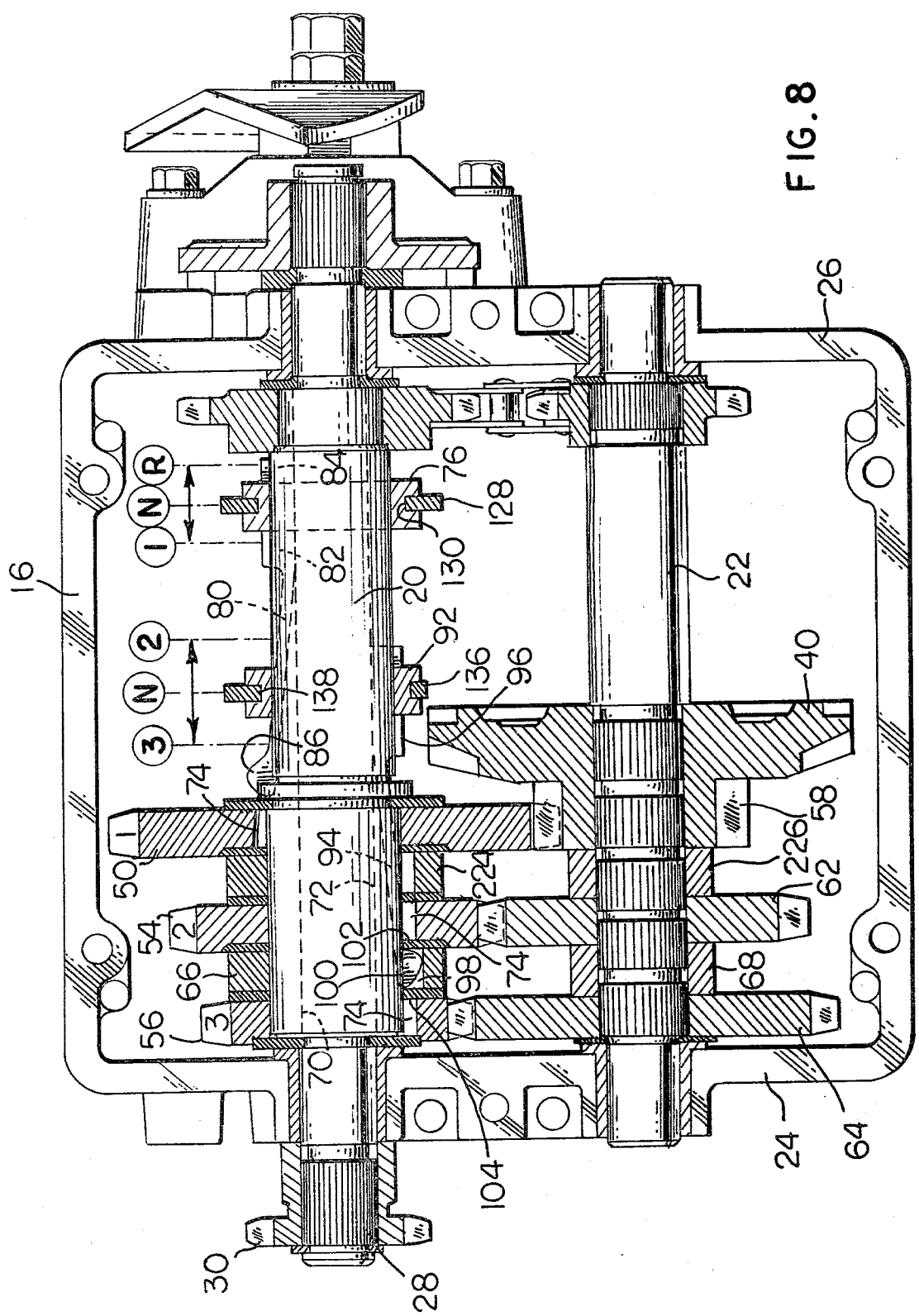

4,212,210

MULTI-SPEED TRANSMISSION WITH H-PATTERN SHIFT

BACKGROUND OF THE INVENTION

1. Field of the Invention

This invention relates generally to multi-speed transmissions for small vehicles, such as lawnmowers, lawn tractors and the like, and more particularly to such a multi-speed transmission having an H-pattern shift.

2. Description of the Prior Art

U.S. Pat. No. 3,812,735 to the present inventors, and assigned to the assignee of the present application, discloses a five-speed (four speeds forward and one reverse) transmission in which the four forward speed gears are mounted on the output shaft in sequence and are sequentially engaged by a key axially movable in a slot in the output shaft, the key being drivingly connected to a shift collar axially movable on the output shaft which is selectively moved by a linear-acting shaft lever. U.S. Reissue Pat. No. RE 26,633 to Orly Musgrave discloses a four-speed transmission (three forward and one reverse) in which there are a pair of collars on the output shaft each selectively movable between a first position drivingly engaging one output gear and a second position drivingly engaging another output gear, the two shift collars being actuated between their respective positions by a shift lever operated in an H-pattern; however, there is no practical way to add a fourth forward speed to the transmission described and illustrated in the Musgrave patent.

It is accordingly desirable to provide a multi-speed transmission having the simplicity and five-speed capability of the transmission of our aforesaid patent but incorporating the familiar H-pattern shift commonly found in automotive vehicles.

SUMMARY OF THE INVENTION

A multi-speed transmission including a housing and spaced, parallel output and intermediate shafts journalled therein along with an output shaft which is drivingly connected to the intermediate shaft. A gear on the intermediate shaft is drivingly connected to a reverse gear rotatably mounted on the output shaft. A group of at least first, second and third forward gears is rotatably mounted on the output shaft, the reverse gear and each of the forward gears having a plurality of radially spaced, axially extending notches formed therein. The gear group is axially spaced from the reverse gear, and at least three gears are mounted on the intermediate shaft for rotation therewith and are respectively drivingly connected to the gears of the group. A first axially extending slot in the output shaft extends under at least the first gear of the group, and a first collar is mounted on the shaft intermediate the reverse gear and the group, the first collar being axially movable on the output shaft in either direction from a neutral position to first and second positions, respectively. A driving member is rotatable and axially movable with the first collar and drivingly engages a notch in the reverse gear in the first position of the first collar thereby drivingly to connect the reverse gear to the output shaft. A first key in the first slot is drivingly connected to the first collar and is rotatable and axially movable therewith, the first key extending toward the gear group and drivingly engaging a notch in the first gear in the second position of the first collar thereby drivingly to connect the first gear to the output shaft. A second collar is mounted on the output shaft intermediate the first collar and the gear group, the second collar also being axially movable on the output shaft in either direction from a neutral position to first and second positions, respectively, the second collar surrounding the first key. A second axially extending slot is formed in the output shaft extending under the gears of the group, and a second key is provided in the second slot drivingly connected to the second collar and axially movable therewith. The second and third gears are axially spaced, and the second key has a driving portion thereon which extends into the space between the second and third gears in the neutral position of the second collar, the driving portion of the second key drivingly engaging a notch in the second gear in the first position of the second collar, and drivingly engaging a notch in the third gear in the second position of the second collar thereby drivingly to connect the second and third gears, respectively, to the output shaft. A shift lever is provided operatively connected to the first and second collars for selectively moving the same to the positions thereof.

In the preferred embodiment, the shift lever is mounted on the housing for movement in an H-pattern, and four forward gears are mounted on the output shaft.

It is accordingly an object of the invention to provide an improved multi-speed transmission.

Another object of the invention is to provide an improved multi-speed transmission having an H-pattern shift.

A further object of the invention is to provide an improved multi-speed transmission having an H-pattern shift and the capability of providing four forward speeds.

The above-mentioned and other features and objects of this invention and the manner of attaining them will become more apparent and the invention itself will be best understood by reference to the following description of embodiments of the invention taken in conjunction with the accompanying drawings.

BRIEF DESCRIPTION OF THE DRAWINGS

FIG. 2 is a top view of the transmission of FIG. 1;

FIG. 3 is a cross-sectional view taken generally along the line 3—3 of FIGS. 1 and 2;

FIG. 4 is a top view of the gear shifting linkage employed, taken generally along the line 4—4 of FIG. 3;

FIG. 5 is a side view of the gear shifting linkage of FIG. 4, as viewed generally along the line 5—5 of FIG. 4;

FIG. 6 is a fragmentary, cross-sectional view showing the detent mechanism, taken generally along the line 6—6 of FIG. 2;

FIG. 7 is a side view showing one of the forward gears employed; and

FIG. 8 is a fragmentary, top, cross-sectional view similar to FIG. 1 but showing the transmission of the invention adapted for three forward speeds.

DESCRIPTION OF THE PREFERRED EMBODIMENTS

Figure 1:
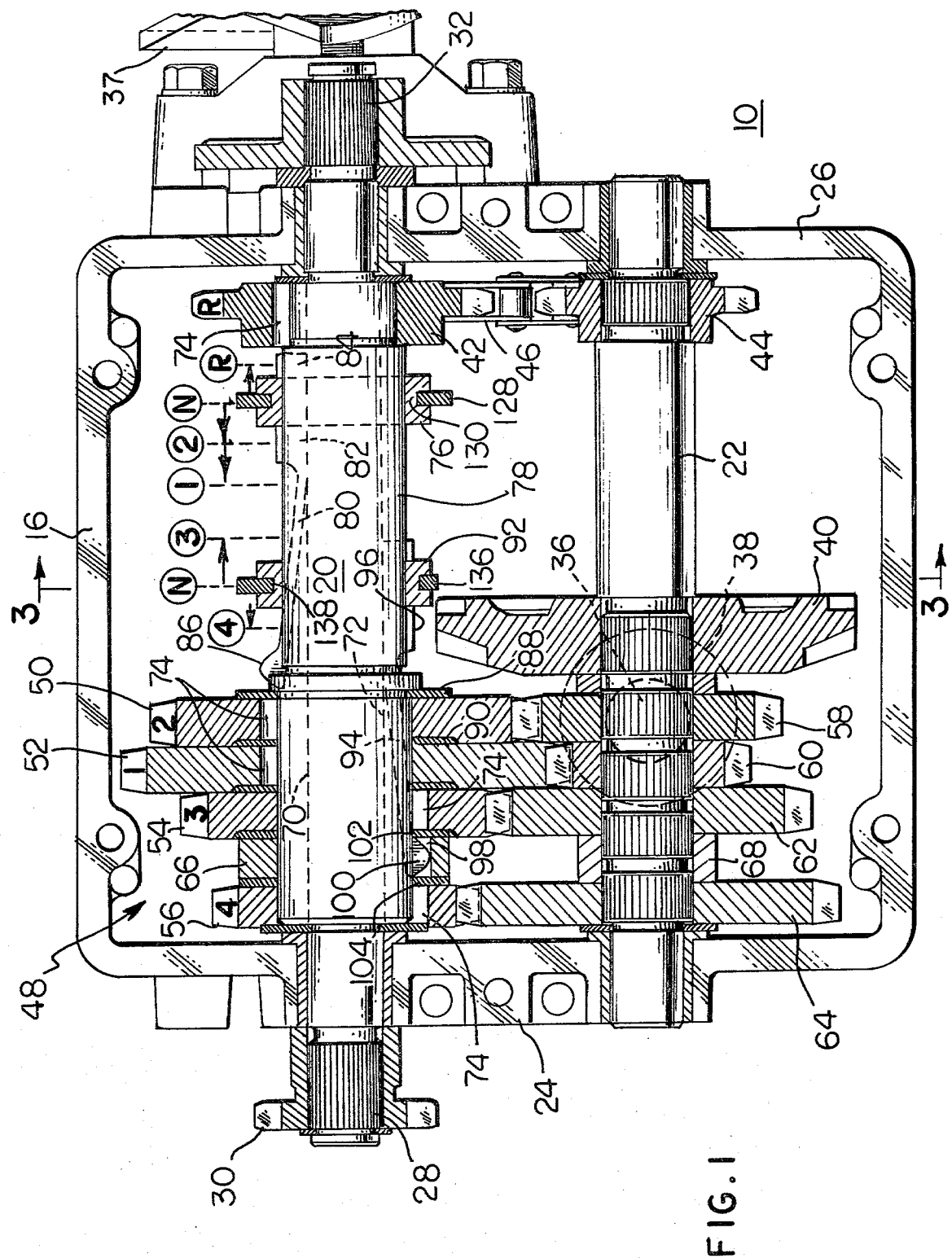
FIG. 1 is a top, cross-sectional view of the improved, multi-speed transmission of the invention incorporating four forward speed gears.

The multi-speed transmission of the present invention incorporates certain features more fully illustrated and described in our aforesaid U.S. Pat. No. 3,812,735, and certain other features more fully illustrated and described in the aforesaid U.S. Pat. RE No. 26,633, and reference may be had to those patents for a further description of such features.

Referring now to FIGS. 1-7 of the drawings, the improved five-speed transmission of the invention, generally indicated at 10, comprises housing 12 having parts 14, 16 held in assembled relation by suitable threaded fasteners 18. Output shaft 20 and intermediate shaft 22 are journalled in end walls 24, 26 of housing 12. Output shaft 20 has extension portion 28 having output sprocket 30 thereon. Output shaft 20 also has extension portion 32 adapted to be engaged by manually-actuated brake lever 34 which does not form a part of the present invention and need not further be described. Input shaft 36 is journalled in housing part 16 and has bevel gear 38 thereon meshing with bevel gear 40 mounted on intermediate shaft 22 for rotation therewith.

Reverse gear 42 is rotatably mounted on output shaft 20 and is driven by gear 44 mounted on intermediate shaft 22 for rotation therewith by suitable drive chain 46. It will be readily understood that an idler gear may be substituted for drive chain 46. Group 48 of gears 50, 52, 54, 56 is rotatably mounted on output shaft 20, group 48 being axially spaced from reverse gear 42. The gears comprising group 48 are respectively driven by gears 58, 60, 62, 64 mounted on intermediate shaft 22 and rotatable therewith. The gears of group 48 are the forward speed gears and in this embodiment, gear 52 provides the lowest speed for output shaft 20, gear 50 provides the second lowest speed, gear 54 provides the third speed, and gear 56 provides the highest rotational speed for output shaft 20. It will be seen that third and fourth speed gears 54, 56 are axially spaced-apart by spacer 66, corresponding gears 62, 64 on intermediate shaft 22 being also spaced-apart by spacer 68.

Output shaft 20 has diametrically opposite, axially extending slots 70, 72 formed therein extending under reverse gear 42 and forward gear group 48. Referring briefly to FIG. 7, each of gears 42, 50, 52, 54, 56 has a plurality of notches 74 formed therein communicating with output shaft 20 and grooves 70, 72 therein.

First collar 76 is positioned on portion 78 of output shaft 20 intermediate reverse gear 42 and forward gear group 48 for axial movement thereon. Key 80 in slot 70 has portion 82 secured to collar 76 so as to be axially movable therewith. Collar 76 is axially movable on output shaft 20 from a neutral position, as shown in FIG. 1, to a reverse position in which portion 84 of key 80 engages a notch 74 in reverse gear 42 thereby drivingly to connect reverse gear 42 to output shaft 20. Collar 76 is axially movable on shaft 20 in the opposite direction sequentially to a second gear position, and then to a first or low speed position, as also shown in FIG. 1. Key 80 has portion 86 at the end thereof which extends out of slot 70 and is axially spaced from gear 50 in the neutral position of shift collar 76. When shift collar 76 is moved axially to its second gear position, portion 86 of key 80 is forced into slot 70 by washer 88 and when it passes washer 88, springs outwardly so that portion 86 engages a notch 74 in second gear 50 thereby drivingly to connect gear 50 to output shaft 20. When shift collar 76 is moved further toward its first speed position, portion 86 of key 80 is forced into slot 70 by washer 90 and when portion 86 passes washer 90, it moves outwardly under spring action into a notch 74 of the first speed gear 52, as more fully described in or aforesaid U.S. Pat. No. 3,812,735.

A second shift collar 92 is mounted on section 78 of output shaft 20 between collar 76 and forward gear group 48 and is axially movable thereon in opposite directions from a neutral position, as shown in FIG. 1, to third and fourth gear positions. A second key 94 in slot 72 in output shaft 20 has portion 96 secured to collar 92 for axial and rotational movement therewith. Spacer 66 has notch 98 formed therein communicating with slot 72, and key 94 which extends under gears 50, 52, 54 has portion 100 thereon which is sprung into notch 98 in the neutral position of collar 92. It will be seen that movement of collar 92 to its third gear position, as shown in FIG. 1, causes portion 100 of key 94 to be forced into slot 72 by engagement with washer 102 and that when portion 100 passes washer 102, it is sprung outwardly into a notch 74 in third speed gear 54 thereby drivingly to connect gear 54 to output shaft 20. Likewise, movement of collar 92 to its fourth speed position causes portion 100 of key 94 to be forced into slot 72 by engagement with washer 104 and then is sprung outwardly into a notch 74 in fourth speed gear 56 thereby drivingly to connect gear 56 to output shaft 20.

Gear shift lever 106 is provided having manual-operating end 108 and actuating end 110. Gear shift lever 106 has ball portion 112 intermediate its ends mounted in seat 114 on projecting portion 116 on housing part 14 and having cap portion 118 secured thereto, as by threaded fasteners 120. Actuating end 110 of gear shift lever 106 extends into the interior of housing 12 through opening 122 in projecting portion 116.

First and second link members 124, 126 are provided, link member 124 having first portion 128 seated in groove 130 in shift collar 76, second portion 132, and third portion 134 joining portions 128 and 132, and link member 126 having first portion 136 seated in groove 138 in shift collar 92, second portion 138 and connecting portion 140. It will be seen that portions 128, 136 are normal to plane 142 including axes 144, 146 of shafts 20, 22, and that portions 132, 138 are in spaced, parallel relationship with plane 142. Portions 132, 138 of link members 124, 126 have closely adjacent edges 148, 150 extending parallel with axis 146 of intermediate shaft 22 and respectively having driving notches 152, 154 formed therein (FIG. 4) through which actuating end 110 of gear shift lever 106 extends. Portion 132 of link member 124 also has aligned openings 156, 158 formed therein parallel with edge 148, and portion 138 of link member 126 has aligned elongated openings 160, 162 in spaced, parallel relationship with edge 150.

Plate member 164 underlays portions 132, 138 of link members 124, 126 and has elongated, spaced, parallel openings 166, 167, 168, 169 and elongated opening 170 formed therein which define substantially an "H"-shaped configuration, as best seen in FIG. 4. Actuating end 110 of gear shift lever 106 extends through opening 170 in plate member 164.

Plate member 164 has oppositely facing, up-turned portions 172, 174 formed therein respectively seated in notches 176, 178 in portions 132, 138 of link members 124, 126. Link members 124, 126 and plate member 164 are held in assembled relation by suitable threaded fasteners 180 extending through openings 166, 167, 168, 169 in plate member 164 and openings 156, 158, 160, 162 in portions 132, 138, as best seen in FIG. 4.

The gear shift mechanism described above is similar to that described and illustrated in the aforesaid U.S. Pat. RE No. 26,633; however, it will be observed that here, actuating end 110 of gear shift lever 106 in its neutral position is aligned with axis 146 of intermediate shaft 22, as best seen in FIG. 3, whereas, in the aforesaid U.S. Pat. RE No. 26,633, the actuating end of the gear shift lever is aligned with the axis of the output shaft. Reference to FIG. 4 will reveal that actuating end 110 of gear shift lever 106 may be moved in the direction shown by arrow 182 from the neutral position to a first side position, and in the opposite direction 184 from the neutral position to a second side position, as shown in dashed lines at 186, 188, respectively, openings 152, 154 in portions 132, 138 of plate members 124, 126, and openings 166, 167, 168, 169 in plate member 164 accommodating such lateral movement.

It will further be seen that upon movement of actuating end 110 of shift lever 106 in direction 182 from the neutral position to the first side position 186 with accompanying lateral movement in the same direction of plate 164, actuating end 110 of shift lever 106 may then be moved in the direction shown by arrow 190, thereby to move portions 128, 132 and 134 to the position shown in dashed lines at 192, such movement resulting in movement of first collar 76 to its reverse position with portion 84 of key 80 engaging a notch 74 in reverse gear 42, thereby drivingly to connect reverse gear 42 to output shaft 20. It will be observed that this axial movement of portion 132 of link member 124 is accommodated by elongated openings 156, 158, end portion 132 and opening 170 and plate member 164. Similarly, movement of actuating end 110 of shift lever 106 from its first side position 186 in the opposite direction shown by arrow 194 will move portions 128, 134, 132 of link member 124 to the position shown in dashed lines at 196, 198 (FIGS. 4 and 5), thereby moving first shift collar 76 to its second and first forward speed positions, respectively, thereby respectively drivingly to connect second and first gears 50, 52 to output shaft 20. In like manner, movement of actuating end 110 of shift lever 106 from its second side position 188 in the direction shown by arrow 200 will result in moving portions 136, 138 and 140 of link member 126 to the positions shown in dashed lines at 202 (FIGS. 4 and 5) resulting in movement of second shift collar 92 to its third speed position thereby drivingly to connect third speed gear 54 to output shaft 20, and movement of actuating end 110 of gear shift lever 106 from its second side position 188 in the direction shown by arrow 204 will move portions 136, 138 and 140 of link member 126 to the position shown in dashed lines at 206 (FIG. 5) so as to move second shift collar 92 in its fourth speed position thereby drivingly to connect fourth speed gear 56 to output shaft 20.

Reference to FIGS. 4 and 5 will now reveal that third portion 134 of first link member 124 is disposed to underlie third portion 140 of second link member 126 thereby permitting the above-described independent movement of link members 124, 126 to the various positions thereof, as above-described.

Referring now to FIGS. 4 and 6, detent holes 208, 210 are formed in portions 132, 138 of link members 124, 126 cooperating with balls 212, 214 urged by springs 216, 218 thereby to provide discrete positions for portions 132, 138 as described in the aforesaid U.S. Pat. No. RE 26,633. Further, corresponding openings 220, 222, may be formed in edges 148, 150 of portions 132, 138 of link members 124, 126 which are aligned in the neutral position of shift lever 106, as best seen in FIG. 4, to receive a ball element of a starting switch mechanism which permits starting of the engine of the vehicle only in the neutral position, as further described and illustrated in our aforesaid U.S. Pat. No. 3,812,735.

Referring now to FIG. 8 in which like elements are indicated by like reference numerals, it will be seen that a four-speed (three forward and one reverse) transmission is provided by eliminating gears 52, 60 of the previous embodiment and substituting therefore spacers 224, 226, between forward gears 50, 54, and gears 58, 62, respectively. In this embodiment, gear 50 becomes the first or lowest speed gear and gears 54, 56 become the second and third speed gears, respectively.

It will now be seen that I have provided, in accordance with the invention, a multi-speed transmission having a linear arrangement of four gears and capable of providing up to four forward speeds with an H-pattern gear shift.

While there have been described above the principles of this invention in connection with specific apparatus, it is to be clearly understood that this description is made only by way of example and not as a limitation to the scope of the invention.

What is claimed is:

1. In a multi-speed transmission including a housing, an output shaft journalled in said housing, an intermediate shaft journalled in said housing in spaced, parallel relationship with said output shaft, an input shaft journalled in said housing and drivingly connected to said intermediate shaft, a reverse gear rotatably mounted on said output shaft, a gear on said intermediate shaft drivingly connected to said reverse gear, a group of at least first, second and third forward gears rotatably mounted on said output shaft, said reverse gear and each gear of said group having a plurality of radially spaced, axially extending notches formed therein, said group being axially spaced from said reverse gear, at least three gears mounted on said intermediate shaft for rotation therewith and respectively drivingly connected to the gears of said group, at least one axially extending slot in said output shaft extending under at least the first gear of said group, a collar mounted on said output shaft intermediate said reverse gear and said gear group, said collar being axially movable on said output shaft in either direction from a neutral position to first and second positions, respectively, a driving member axially movable with said collar, said driving member extending toward said reverse gear and drivingly engaging a said notch therein in said first position of said collar thereby drivingly to connect said reverse gear to said output shaft, a key in said slot connected to said collar and axially movable therewith, said key extending toward said gear group and drivingly engaging a said notch in said first gear in said second position of said collar thereby drivingly to connect said first gear to said output shaft, and a manual gear-shift lever mounted on said housing and operatively connected to said collar for selectively moving the same to said positions thereof, the improvement comprising: a second collar mounted on said output shaft intermediate said first-named collar and gear group, said second collar being axially movable on said output shaft in either direction from a neutral position to first and second positions, respectively, said second collar surrounding said first-named key; a second axially extending slot in said output shaft extending under the gears of said group, a second key in said second slot and axially movable therewith, said second and third gears being axially spaced, said second key having a driving portion thereon which extends into the space between said second and third gears in said neutral position of said second collar, said driving portion drivingly engaging a said notch in said second gear in said first position of said second collar and drivingly engaging a said notch in said third gear in said second position of said second collar thereby drivingly to connect said second and third gears, respectively, to said output shaft; said shift lever being operatively connected to said second collar for selectively moving the same to said positions thereof.

2. The transmission of claim 1 wherein said shift lever has a manually-operated end and a shift-actuating end, said lever being mounted intermediate its ends for movement of said actuating end in a first direction from a neutral position to a first side position and in second opposite directions from said first side position generally parallel with the axes of said intermediate and output shafts and at right angles to said first direction to first and second positions, and in a third direction opposite said first direction from said neutral position to a second side position and in fourth opposite directions from said second side position generally parallel with said second direction and at right angles to said third direction to third and fourth positions thereby to define substantially an H-shift pattern; and further comprising a first link connected to said first collar and adapted to be engaged by said actuating end of said lever in said first side position thereof and to be moved thereby in said second directions thereby to move said first collar to said positions thereof; and a second link connected to said second collar and adapted to be engaged by said actuating end of said lever in said second side position thereof and to be moved thereby in said fourth directions thereby to move said second collar to said positions thereof.

3. The transmission of claim 2 wherein said actuating end of said shift lever in said neutral position thereof lies on an axis extending adjacent the axis of said intermediate shaft and generally normal to a plane including the axes of said intermediate and output shafts, said first link including a first portion connected to said first collar and extending generally normal to said plane, a second portion adapted to be engaged by said actuating end of said shift lever and in spaced, parallel relationship with said plane, and a third portion connecting said first and second portions, said second link including a first portion connected to said second collar and extending generally normal to said plane, a second portion adapted to be engaged by said actuating end of said shift lever and in spaced, parallel relationship with said plane, and a third portion connecting said first and second portions of said second link, said first portions of said first and second links respectively lying in spaced, parallel planes generally normal to said second and fourth directions, and said third portions respectively extending generally normal to said second and fourth directions.

4. The transmission of claim 3 wherein said second portions of said first and second links respectively have corresponding first and second opposite ends, said third portions being respectively connected to said second portions adjacent said first ends thereof, said second portion of said first link being axially longer than said second portion of said second link, said third portion of said first link being in spaced, parallel relationship with said first end of said second portion of said second link.

5. The transmission of claim 4 wherein said third portion of said second link in said neutral positions thereof overlays said third portion of said first link in said second position thereof.

6. The transmission of claim 1 wherein said first gear of said group is nearest said reverse gear and said third gear is most remote therefrom, said second key extending in said other slot under said first gear.

7. The transmission of claim 6 wherein said group of gears includes a fourth forward gear intermediate said first and second gears and having a plurality of said notches therein, said first collar being axially movable on said output shaft to a third position on the side of said second position remote from said neutral position thereof, said first-named slot extending under said fourth gear, said first-named key drivingly engaging a said notch in said fourth gear in said third position of said first collar thereby drivingly to connect said fourth gear to said output shaft, said first key extending in said first-named slot under said first gear in said third position of said first collar, said second key extending in said second slot under said fourth gear.

8. The transmission of claim 1 wherein said shift lever has a manually-operated end and a shift-actuating end, said lever being mounted intermediate its ends for movement of said actuating end in a first direction from a neutral position to a first side position and in second opposite directions from said first side position generally parallel with the axes of said intermediate and output shafts and at right angles to said first direction to first and second positions, and in a third direction opposite said first direction from said neutral position to a second side position and in fourth opposite directions from said second side position generally parallel with said second directions and at right angles to said third directions to third and fourth positions thereby to define substantially an H-shift pattern, said actuating end of said shift lever in said neutral position thereof lying on an axis which intersects the axes of said intermediate shaft and which is generally normal to a plane including the axes of said intermediate and output shafts; and further comprising a first link having a first portion connected to said first collar and extending generally normal to said plane, a second portion in spaced, parallel relationship with said plane and adapted to be engaged by said actuating end of said shift lever in said first side position thereof thereby to move said first collar to said positions thereof, and a third portion connecting said second and first portions; and a second link including a first portion connected to said second collar and extending generally normal to said plane, a second portion in spaced, parallel relationship with said plane and adapted to be engaged by said actuating end of said shift lever in said second side position thereof thereby to move said second collar to said positions thereof, and a third portion connecting said second and first portions; said first portions of said first and second links respectively lying in spaced parallel planes generally normal to said second and fourth directions, said second portions respectively having corresponding first and second opposite ends, said third portions being respectively connected to said second portions adjacent said first ends thereof and extending generally normal to said second and fourth directions, said second portion of said first link being axially longer than said second portion of said second link, said third portion of said first link being in spaced, parallel relationship with said first end of said end of said second portion of said second link.

9. The transmission of claim 8 wherein said group of gears includes a fourth gear having a plurality of said notches therein, said first gear of said group being nearest said reverse gear and said third gear being most remote therefrom, said fourth gear being intermediate said first and second gears, said second key extending in said other slot under said first and fourth gears, said first collar being axially movable on said output shaft to a third position on the side of said second position remote from said neutral position thereof, said first-named key drivingly engaging a said notch in said fourth gear in said third position of said first collar thereby drivingly to connect said fourth gear to said output shaft, said first key extending in said first-named slot under said first gear in said third position of said first collar, said shift lever being movable in said second direction from said second position to a third position remote from said neutral position.

10. The transmission of claim 9 wherein at least said first-named slot extends under said reverse gear, said driving member comprising a portion of said first key in said first slot extending toward said reverse gear.

* * * * *